Patented Oct. 15, 1929

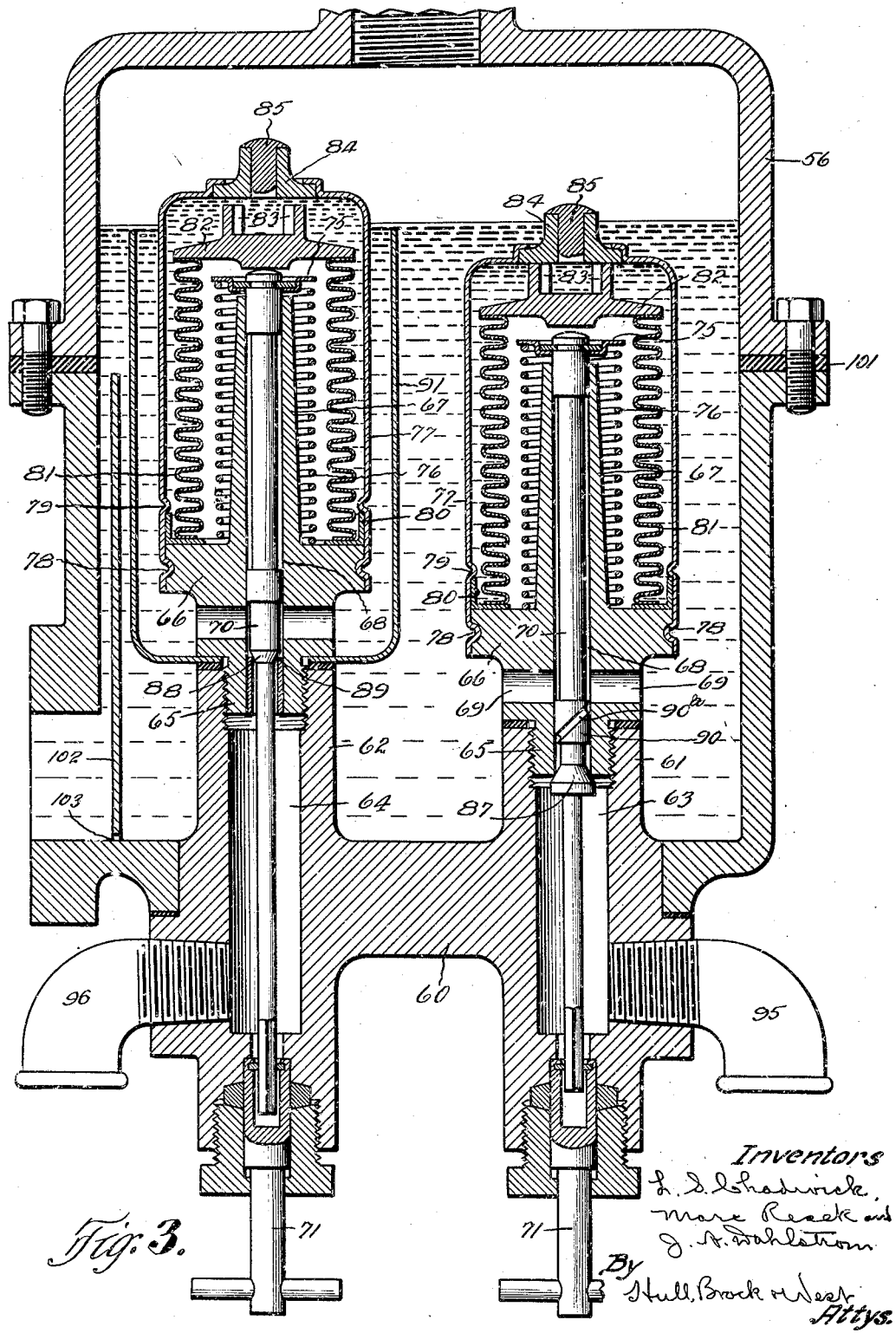

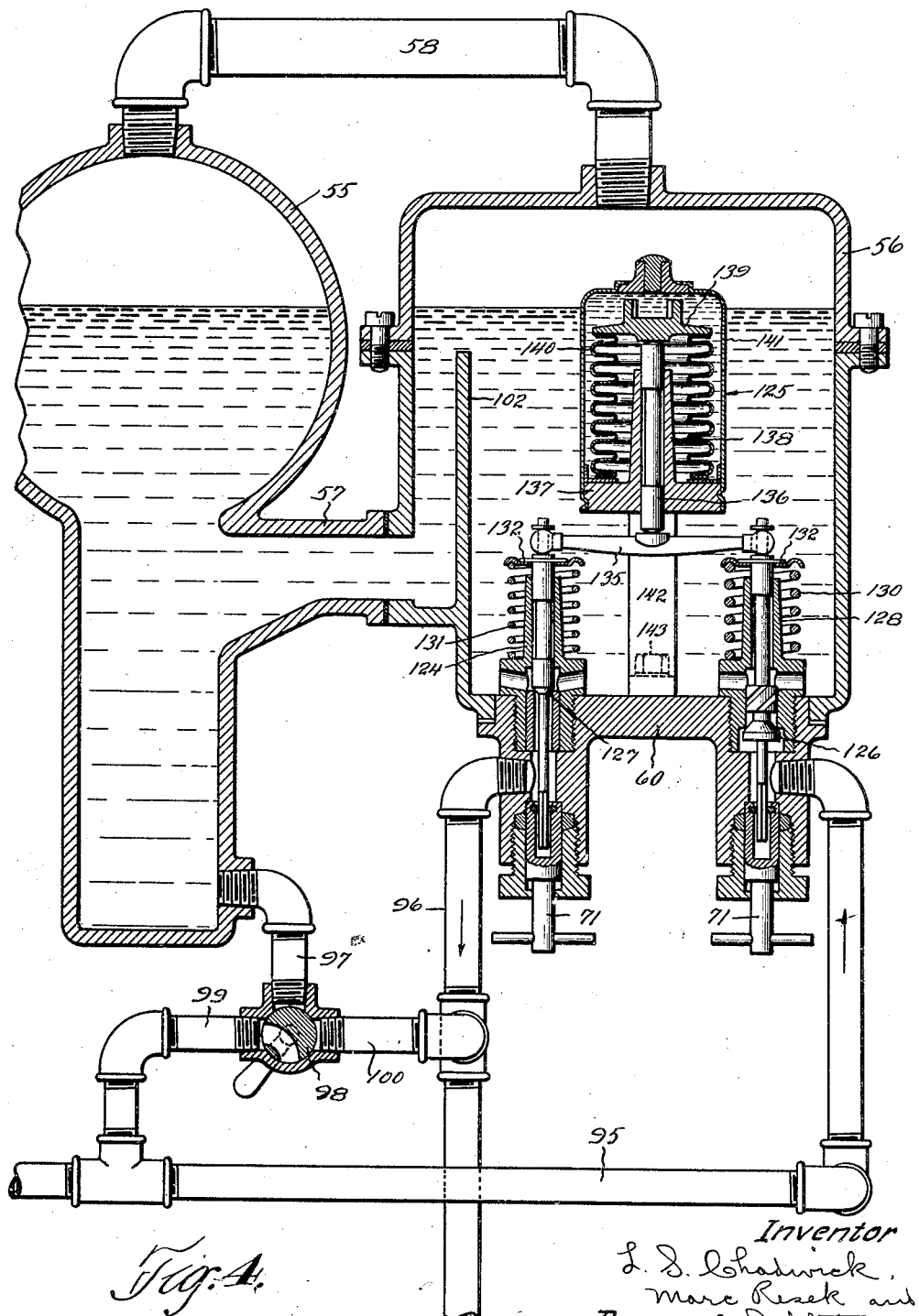

1,732,200

UNITED STATES PATENT OFFICE

LEE S. CHADWICK, OF SHAKER HEIGHTS, MARC RESEK, OF CLEVELAND HEIGHTS, AND JOHN ALGER DAHLSTROM, OF EAST CLEVELAND, OHIO, ASSIGNORS TO PERFECTION STOVE COMPANY, OF CLEVELAND, OHIO, A CORPORATION OF OHIO

LIQUID-LEVEL-CONTROL APPARATUS

Application filed November 16, 1925. Serial No. 69,330.

This invention relates, generally, to liquid level control means, and more particularly to apparatus for maintaining a substantially constant liquid or water level in tanks or receivers, accumulators, steam boilers or generators, and the like.

The objects of the invention are to provide a thoroughly reliable and efficient apparatus of the aforesaid character that acts automatically to shut off the liquid or water supply when a predetermined level has been attained in the receiver, and similarly functions to emit any liquid or water that may accumulate within the receiver from any cause in excess of that required to effect the aforesaid level; to provide apparatus of the foregoing nature that will, so far as possible, be immune from any disorders arising from an accumulation of sediment or scale, the operating parts being situated in the fresh liquid or water supply; to provide liquid level control apparatus of the above mentioned character that is comparatively simple of construction and operation, and is substantial and durable; and to provide, in apparatus of this character, means located outside the casing that houses the valves and valve operating mechanism and by means of which the valves and valve seats may be ground when desired without the need of dismantling, or suspending the operation of, the apparatus.

Figure 1:
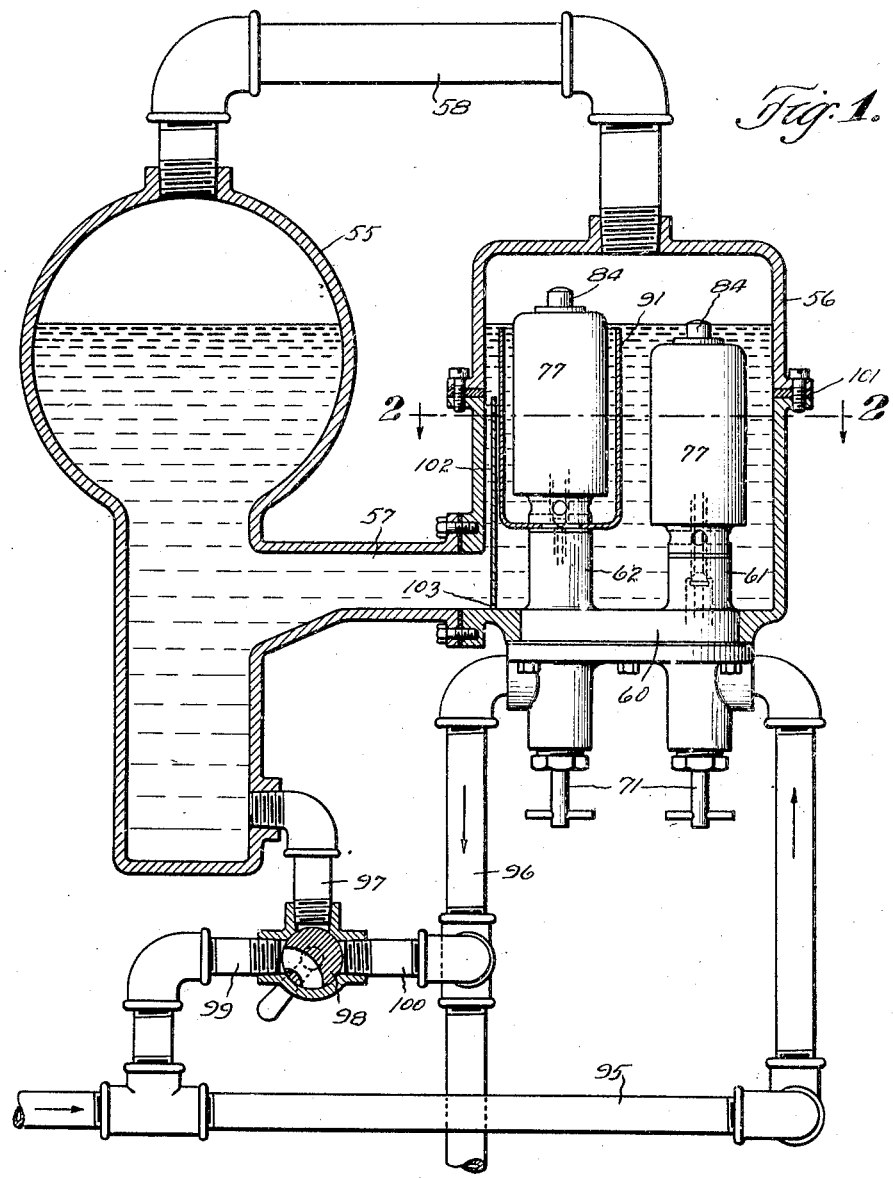
Figure 2:
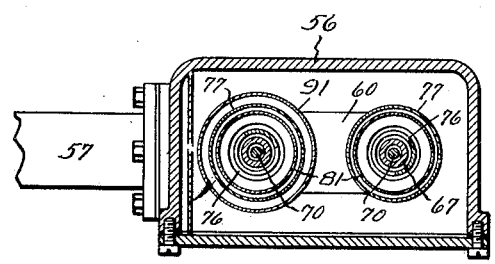

These objects, with others hereinafter appearing, are attained in the embodiments of the invention illustrated in the accompanying drawings wherein Fig. 1 is a vertical section through a liquid level control apparatus constructed in accordance with our invention and shown as connected to a steam boiler; Fig. 2 is a section on the line 2—2 of Fig. 1; Fig. 3 is an enlarged sectional detail of the valves and the thermostatic means for operating them; and Fig. 4 is a view similar to Fig. 1 showing a modification wherein only one thermostat is employed for operating both the inlet and outlet valves.

Referring particularly to Fig. 1, 55 is a steam boiler or generator and 56 is a casing which encloses the thermostatic means for operating the valves. Communication is established between the boiler or generator 55 and the casing 56, below the water level, through a conduit 57, and above the water level, through a pipe 58, thus insuring a water level common to both receptacles, and the presence of steam in the casing when the boiler is in operation.

Applied to the bottom of the casing 56 is a fitting 60 which incorporates substantially parallel bosses 61 and 62 that are divided in length between the inner and outer sides of the body portion of the fitting. The bosses 61 and 62 have bores 63 and 64, respectively, (see Fig. 3) the upper ends of which are internally threaded for the application of thermostatic devices which actuate the inlet and outlet valves. These devices are substantially identical and a detailed description of one will suffice for both, the same reference characters designating the corresponding parts of the two. Adapted to be screwed into the upper end of the boss 61 or 62, whichever the case may be, is the threaded projection 65 of a base 66. An elongated axial extension 67 rises from the base 66 and has, in common with the base and projection 65, a bore 68. Ports 69 extend outwardly from the bore 68 through the reduced lower portion of the base 66. Guided within the bore 68 is a valve stem 70 which projects downwardly through the bore of the boss (61 or 62) and at its lower end is squared for cooperation with a grinding key 71. Applied to the upper end of the valve stem 70, where it protrudes beyond the extension 67, is an abutment 75 between which and the base 66 a spring 76 is compressed.

Attached to the base 66, preferably in such manner that it may be conveniently removed therefrom, is a unit which constitutes the thermostatic means for depressing the valve stem 70 against the tension of the spring 76. This unit is shown as consisting of a cylindrical shell 77 that fits down over the enlarged portion of the base 66 and has threads 78 for cooperation with threads in the periphery of the base. The shell 77 is desirably formed of sheet metal, and the threads 78 are preferably depressed or rolled therein. Fitted within the lower end of the shell, against a bead or shoulder 79, is an annulus 80, shown as angular in cross section, and the lower end of a bellows 81 is secured, as by soldering, to this annulus, while the upper end of the bellows is similarly secured to a cap 82 that has lugs 83 for spacing it from the top of the shell 77. Incorporated in the upper end of the shell is a filling tube 84 through which a suitable fluid, that is sensitive to temperature changes, may be introduced into the shell and occupy the space about the bellows 81, the tube 84 being hereafter sealed by a suitable plug 85. It is apparent form the construction above described that it is a simple matter to remove the unit comprised of the shell 77 and bellows 81 from the base 66 without disturbing the unit assembly in any way and thus give access to the valve stem 70 and springs 76.

A valve is formed on each of the stems 70, the one associated with the boss 61 being the inlet valve and designated 87, while the one associated with the boss 62 is the outlet valve and is designated 88. The former valve seats against the lower end of the corresponding projection 65 and opens downwardly, while the latter valve seats against the upper end of a thimble 89, that is pressed into the lower end of the corresponding projection 65, and opens upwardly. Immediately above the inlet valve 87, the stem 70 is provided with an enlargement 90 which freely slides within the bore 68 and serves as a guide for the stem, said enlargement having one or more passageways 90ᵃ which permits the passage of liquid about it. For a purpose which shall presently appear, an overflow tube 91 is associated with the outlet valve 88, the same being shown as supported in spaced relation to the corresponding shell 77 with its lower inwardly turned end clamped between the base 66 and the upper end of the boss 62. A water supply pipe 95 is connected to the boss 61 and communicates with the bore 63 thereof, as clearly shown in Fig. 3, while a waste pipe 96 connects to the boss 62 and communicates with the bore 64 thereof. A pipe 97, which has connection with the lower end of the boiler or generator 55, is adapted to be thrown into communication with either of the pipes 95 or 96 through a two-way valve 98 and branch pipes 99 and 100.

Before going into the operation of the apparatus just described it should be explained that the casing 56 is preferably divided into upper and lower sections that are insulated from each other by a gasket 101 of packing material that is of comparatively low heat conducting quality. A dam 102 rises from the bottom of the lower section of the casing to about the plane of the upper edge thereof and is located adjacent the side wall through which the conduit 57 opens. At its extreme lower edge the dam is provided with a drain opening 103.

In considering the operation of this form of the invention it will be assumed that there is no water present in the system, excepting, of course, in the supply pipe 95; and it should be explained that when the system is cold, as before its operation has been started, the inlet valve 87 is closed and the outlet valve 88 is open. The reason for this will presently appear, although it may be stated here that when steam is generated in the system and the same has access to the shells 77 of the thermostatic elements, the valve rods 70 are depressed thereby to open the inlet valve 87 and close the outlet valve 88. To admit the initial supply of water to the system, the valve 98 is positioned to throw the branch pipe 99 into communication with the pipe 97 whereupon water will flow from the supply pipe 95, through the former pipes, to the boiler or generator 55 and thence, through the conduit 57, to the casing 56, the major part of the water passing over the top of the dam 102 as only a limited amount will seep through the opening 103. The water will continue to rise in the generator and casing 56 until the level reaches the upper edge of the overflow tube 91. As soon as this occurs, the excess water will drain through the overflow tube and bore 64 to the waste pipe 96. At such time, the valve 98 may be closed, in which position it is shown in Fig. 1. The heat may then be applied to the boiler or generator 55 and when steam has been created within the boiler and is communicated through the pipe 58 to the casing 56, it will surround the upper end of the thermostatic element which controls the outlet valve 88, causing the fluid within the shell 77 to expand and compress the bellows 81, depressing the valve stem 70 and lowering the outlet valve 88 to its seat.

At this point attention is called to the fact that the thermostatic element which controls the inlet valve 87 is somewhat lower than the other thermostatic element and on this account is surrounded by the water that is within the casing 56 and is thus protected from the temperature of the steam. When water has evaporated or has escaped from the system in sufficient amount to lower the level enough to expose the thermostatic element associated with the inlet valve, the fluid in the shell 77 of this unit expands, contracting the bellows and depressing the valve stem, hereby to remove the inlet valve from its seat so that water may flow from the pipe 95 through the bore 93 into the casing 56 until the level of the water rises sufficiently to protect the aforesaid thermostatic element from the steam. As soon as this occurs, the fluid in the element contracts, permitting the bellows to expand and allowing the spring 76 to lift the inlet valve to its seat.

Now let it be supposed that through leakage of either of the valves 87 or 98 an excess amount of water accumulates within the system. Under this condition the thermostatic element which controls the outlet valve 88 will be submerged and thus protected from the steam, whereupon the fluid in the shell 77 of this thermostatic element will contract, allowing the bellows to expand and permitting the spring 76 to lift the outlet vlave 88 from its seat. The excess water will now flow out through the bore 64 and the waste pipe 96 until the water level has receded sufficiently to expose to the steam the upper end of the thermostatic element that controls the outlet valve whereupon the valve will be returned to its seat.

The heat insulating gasket 101 greatly reduces the conduction of heat through the walls of the casing from the steam filled upper portion of the casing to the water that fills the lower portion thereof; and the dam 102 compels the cool water entering through the inlet valve to rise about the thermostats before its temperature is raised materially by reason of its proximity to or contact with the steam or its mixing with the condensate.

When it is desired to drain the system, the valve 98 may be turned to throw the pipe 97 into communication, through the branch pipe 100, with the waste pipe 96, the water from the casing 56 that is below the level of the dam 102 escaping through the drain opening 103.

In the embodiment of the invention illustrated in Fig. 4 we employ a single thermostat, designated 125, for operating both the inlet valve 126 and the outlet valve 127. The general parts of the apparatus are identified by the same reference characters in both Figs. 1 and 4.

The stems of the respective valves 126 and 127 are guided within tubular members 128 and 129 that are threaded at their lower ends into the bores 63 and 64 of the fitting 60. The inlet valve 126 seats upwardly against the lower end of the member 128, while the outlet valve 127 seats downwardly against the upper end of a thimble that is pressed into the lower end of the member 129. The respective valves are adapted to be lifted by springs 130 and 131 that are interposed between abutments 132, on the upper ends of their stems, and shoulders of the members 128 and 129. The spring 130 is considerably stiffer than spring 131 for a reason which will presently appear.

The opposite ends of an equalizing bar 135 are swiveled to the upper extremities of the valve stems, and a rod 136 bears upon the bar about midway of its ends. This rod is guided within a bore that extends through a base 137 and through an extension 138 thereof, and at its upper end engages a cap 139 of a bellows 140 which, with a shell 141, constitutes the thermostat designated, generally, by the reference numeral 125. The space between the bellows and shell is, of course, filled with a thermal-sensitive fluid. The lower end of the shell 141 is threaded onto the base 137, and a bracket 142 supports the base a suitable distance above the fitting 60 to which the bracket is secured as by a screw 143. The elevation at which the thermostat is supported is such as will project the upper end of the shell slightly above the normal water level of the apparatus.

Preparatory to setting the apparatus in operation, the valve 98 is turned to establish communication between the branch pipes 97 and 99, whereupon water will rise in the boiler to the level determined by the dam 102, any excess flowing over the dam and escaping by way of the outlet valve 127 to the waste pipe 96, for it will be understood that when the system is cold and the thermostat is fully contracted, the spring 131 will hold the outlet valve off its seat. When steam is generated in the boiler due to heat being applied thereto from any suitable source, it is communicated to the casing 56 through the pipe 58 and surrounds the thermostat. This causes the thermostat to expand and depress the rod 136 thereby to rock the equalizing bar, on the shoulder of the outlet valve stem as a fulcrum, and lower the inlet valve from its seat and admit water from the supply pipe 95 to the casing 56. The cool water, rising about the thermostat, causes it to gradually contract so that the relatively strong spring 130 may close the inlet valve. The strength of the spring, relatively to the volatility of the fluid in the thermostat, is such as will cause the valve to close when the water has attained an elevation slightly below the top of the thermostat. The temperature of the steam that surrounds the upper end of the thermostat under these conditions is sufficient to maintain an internal pressure in the thermostat enough superior to the power of the spring 131 to prevent said spring from lifting the outlet valve off its seat. In the event, however, that water accumulates within the system, through leaking of the inlet valve or other cause, until the thermostat is submerged, the latter will completely contract so that the spring 131 may open the outlet valve and allow the excess water to escape. Then when the water level recedes enough to again expose the top of the thermostat to the steam, the thermostat will expand sufficiently to close the outlet valve. Thus it will be seen that the thermostat acts in opposite directions when the water level is above and below normal, to operate both the inlet and outlet valves.

As in the previously described embodiment, in order to drain the system the valve 98 is turned to establish communication between the branch pipes 97 and 100 so that the water in the boiler may flow to the waste pipe 96. The water in the casing 56 that is below the upper edge of the dam 102 will escape when the outlet valve opens due to the cooling off of the thermostat.

Having thus described our invention, what we claim is:

1. In liquid level control apparatus for use with steam boilers, the combination with a boiler, of a casing in communication with the boiler above and below the water level thereof, an inlet valve for controlling the ingress of water to the casing, an outlet valve for controlling the egress of water from the casing, the latter valve communicating with the casing at such an elevation that all water cannot be drained from the casing through said valve, springs tending to close the inlet valve and open the outlet valve, thermostatic means associated with the valves and acting under the influence of the steam temperature to open the inlet valve and close the outlet valve, the cooling influence of the water preventing the action of the thermostatic means on the respective valves when the water level reaches different elevations.

2. In liquid level control apparatus for use with steam boilers, the combination with a boiler, of a casing in communication with the boiler above and below the water level thereof, an inlet valve for controlling the ingress of water to the casing, an outlet valve for controlling the egress of water from the casing, thermostatic means associated with the valves and acting under the influence of the steam temperature to open the inlet valve and close the outlet valve, the cooling influence of the water preventing the action of the thermostatic means on the respective valves when the water level reaches different elevations.

3. In liquid level control apparatus for use with steam boilers, the combination with a boiler, of a casing in communication with the boiler above and below the water level thereof, a water supply, an inlet valve for controlling the ingress of water to the casing from said supply, a water waste, an outlet valve for controlling the egress of water from the casing to said waste, thermostatic means associated with the valves and acting under the influence of the steam temperature to open the inlet valve and close the outlet valve, the cooling influence of the water preventing the action of the thermostatic means on the respective valves when the water level reaches different elevations, a pipe through which the casing may be supplied with water and through which it may also be drained, and means for closing said pipe or for connecting the pipe to either the water supply or the water waste.

4. In liquid level control apparatus for use with steam boilers, the combination with a boiler, of a casing in communication with the boiler above and below the water level thereof, a water supply, an inlet valve for controlling the ingress of water to the casing from said supply, a water waste, an outlet valve for controlling the egress of water from the casing to said waste, the latter valve communicating with the casing at such an elevation that all water cannot be drained from the casing through said valve, springs tending to close the inlet valve and open the outlet valve, thermostatic means associated with the valves and acting under the influence of the steam temperature to open the inlet valve and close the outlet valve, the cooling influence of the water preventing the action of the thermostatic means on the respective valves when the water level reaches different elevations, a pipe through which the casing may be supplied with water and through which it may also be drained, and means for closing said pipe or for connecting the pipe to either the water supply or the water waste.

5. In liquid level control apparatus for use with steam boilers, the combination with a boiler, of a casing in communication with the boiler above and below the water level thereof, a water supply, an inlet valve for controlling the ingress of water to the casing from said supply, a water waste, an outlet valve for controlling the egress of water from the casing to said waste, and thermostatic means associated with the valves and acting under the combined influence of the water and steam temperatures to open the inlet valve and close the outlet valve in response to a rise in temperature, and to close the inlet valve and open the outlet valve in response to a drop in temperature.

6. In liquid level control apparatus for use with steam boilers, the combination with a boiler, of a casing in communication with the boiler above and below the water level thereof, a water supply, an inlet valve for controlling the ingress of water to the casing from said supply, a water waste, an outlet valve for controlling the egress of water from the casing to said waste, the latter valve communicating with the casing at such an elevation that all water cannot be drained from the casing through said valve, thermostatic means associated with the valves and acting under the combined influence of the water and steam temperatures to open the inlet valve and close the outlet valve in response to a rise in temperature, and to close the inlet valve and open the outlet valve in response to a drop in temperature, a pipe through which the casing may be supplied with water and through which the casing may also be drained, and means for closing said pipe or for connecting the pipe to either the water supply or the water waste.

7. In liquid level control apparatus for use with steam boilers, the combination with a boiler, of a casing in communication with the boiler above and below the water level thereof, an inlet valve controlling the flow of water into the casing, a thermostat subject to the combined influence of the temperatures of the steam and the water in the casing, connections through which the thermostat acts to open the inlet valve when the water level drops to such an extent that the temperature of the steam predominates in its influence on the thermostat, an outlet valve controlling the flow of water from the casing, a second thermostat subject to the combined influence of the temperatures of the water and the steam in the casing, connections through which the second thermostat acts to close the outlet valve when the temperature of the steam predominates in its influence on the thermostat and for opening said valve when the temperature of the water predominates, the parts being so regulated that the second thermostat will act to open the outlet valve only when the water level rises substantially above the point at which the inlet valve closes.

8. In liquid level control apparatus for use with steam boilers, the combination with a boiler, of a casing in communication with the boiler above and below the water level thereof, an inlet valve controlling the flow of water into the casing, an outlet valve controlling the flow of water from the casing, thermostatic means associated with the valves and subject to the combined influence of the temperatures of the steam and the water in the casing, means through which the thermostatic means acts to open the inlet valve when the water level drops to such an extent that the temperature of the steam predominates in its influence on the thermostatic means and to close said valve when the water level reaches a greater height, means for holding the outlet valve closed when the water level is at or below the normal height maintained by the inlet valve, and means through which the thermostatic means acts to open the outlet valve when the water level rises substantially above its normal height.

9. In liquid level control apparatus for use with steam boilers, the combination with a boiler, of a casing in communication with the boiler above and below the water level of the boiler and so arranged as to effect a common water level in both the boiler and the casing, an inlet valve and an outlet valve for controlling, respectively, the ingress and egress of water to and from said casing, said valves opening in opposite directions, thermostatic means within the casing subject to the combined influence of the temperatures of the water and steam and having operative connection with the valves whereby said thermostatic means acts when the influence of the steam temperature thereon predominates to open the inlet valve and when the influence of the water temperature thereon predominates to open the outlet valve.

10. In liquid level control apparatus for use with steam boilers, the combination with a boiler, of a casing in communication with the boiler above and below the water level thereof and so arranged as to effect a common water level in both the boiler and the casing, an outwardly opening valve and an inwardly opening valve for controlling the ingress and egress of water to and from said casing, thermostatic means associated with each of the valves which acts under the temperature of the steam for actuating its respective valves, the thermostatic means associated with one of the valves projecting above the normal water level in the casing while the thermostatic means which controls the other valve is situated below said normal water level.

11. In liquid level control apparatus for use with steam boilers, the combination with a boiler, of a casing in communication with the boiler above and below the water level thereof and so arranged as to effect a common water level in both the boiler and the casing, an outwardly opening inlet valve and an inwardly opening outlet valve for controlling, respectively, the ingress and egress of water to and from said casing, thermostatic means associated with each of the valves which acts under the temperature of the steam for moving its respective valve outwardly, the thermostatic means associated with the outlet valve projecting above the normal water level in the casing while the thermostatic means which controls the inlet valve is situated below said normal water level.

12. In liquid level control apparatus for use with steam boilers, the combination with a boiler, of a casing in communication with the boiler above and below the water level thereof and so arranged as to effect a common water level in both the boiler and the casing, an outwardly opening inlet valve and an inwardly opening outlet valve for controlling, respectively, the ingress and egress of water to and from the casing, the stems of said valves rising within the casing, springs tending to elevate the valve stems thereby to close the inlet valve and open the outlet valve, thermostatic means associated with each valve stem and acting under the influence of the steam temperature to depress the stem in opposition to the spring, the thermostats of the respective outlet and inlet valves being situated above and below the normal water level in the casing.

13. In liquid level control apparatus for use with steam boilers, the combination with a boiler, of a casing in communication with the boiler above and below the water level thereof and so arranged as to effect a common water level in both the boiler and the casing, an outwardly opening inlet valve and an inwardly opening outlet valve for controlling, respectively, the ingress and egress of water to and from the casing, the stems of said valves rising within the casing, springs tending to elevate the valve stems thereby to close the inlet valve and open the outlet valve, thermostatic means associated with each of the valve stems and acting under the influence of the steam temperature to depress the stem in opposition to the spring, the thermostats of the respective outlet and inlet valves being situated above and below the normal water level in the casing, and an overflow wall associated with the outlet valve and rising to substantially the normal water level in the casing.

14. In liquid level control apparatus for use with steam boilers, the combination with a boiler, of a casing in communication with the boiler above and below the water level thereof and so arranged to effect a common water level in both the boiler and casing, an outwardly opening inlet valve and an inwardly opening outlet valve for controlling, respectively, the ingress and egress of water to and from the casing, a tubular fitting associated with each of said valves and located inside the casing, the valves having stems rising through said fittings, a spring seat applied to the inner end of each of the valve stems, a spring interposed between said seat and an opposed abutment of the fitting, a bellows surrounding each spring, a shell enclosing each bellows and attached at one end to the corresponding fitting, the end of the shell adjacent its connection with the fitting having a sealed joint with the corresponding end of the bellows, each shell being hermetically sealed and containing a quantity of fluid sensitive to temperature changes, the shells that are associated respectively with the outlet and inlet valves projecting above and being located below the normal water level in the casing.

15. In liquid level control apparatus for use with steam boilers, the combination with a boiler, of a casing in communication with the boiler above and below the water level thereof and so arranged as to effect a common water level in both the boiler and the casing, an outwardly opening inlet valve and an inwardly opening outlet valve for controlling, respectively, the ingress and egress of water to and from the casing, a tubular fitting associated with each of said valves and located inside the casing, the valves having stems rising through said fittings, a spring seat applied to the inner end of each of the valve stems, a spring interposed between said seat and an opposed abutment of the fitting, a bellows surrounding each spring, a shell enclosing each bellows and attached at one end to the corresponding fitting, the end of the shell adjacent its connection with the fitting having a sealed joint with the corresponding end of the bellows, each shell being hermetically sealed and containing a quantity of fluid sensitive to temperature changes, the shells that are respectively associated with the outlet and inlet valves projecting above and being located below the normal water level in the casing, and an overflow tube surrounding the shell that is associated with the outlet valve and rising to substantially the normal liquid level.

16. In liquid level control apparatus for use with steam boilers, the combination with a boiler, of a casing in communication with the boiler above and below the water level thereof and so arranged as to effect a common water level in both the boiler and the casing, an outwardly opening inlet valve and an inwardly opening outlet valve for controlling, respectively, the ingress of water to and the egress of water from the casing, an overflow wall within the casing extending to substantially the normal water level and intercepting the flow of water from the casing, thermostatic means associated with each of the valves and tending under the influence of the steam temperature to move said valves outwardly, the thermostatic means of the respective outlet and inlet valves being disposed above and below the normal water level, a water supply conduit adapted to communicate with the casing via the inlet valve, a waste conduit adapted to communicate with the casing via the outlet valve, a branched conduit through which the boiler is adapted to have communication with the supply conduit and the waste conduit, and a valve within said branched conduit for throwing the boiler into communication with either the supply conduit or the waste conduit.

17. In liquid level control apparatus for use with steam boilers, the combination with a boiler, of a casing in communication with the boiler above and below the water level thereof and so arranged as to effect a common water level in both the boiler and the casing, an outwardly opening inlet valve and an inwardly opening outlet valve for controlling, respectively, the ingress of water to and the egress of water from the casing, an overflow wall within the casing extending to substantially the normal water level and intercepting the flow of water from the casing, thermostatic means associated with each of the valves and tending under the influence of the steam temperature to move said valves outwardly, the thermostatic means of the respective outlet and inlet valves being disposed above and below the normal water level, a water supply conduit adapted to communicate with the casing via the inlet valve, a waste conduit adapted to communicate with the casing via the outlet valve, a branch conduit through which the casing is adapted to receive water from the supply conduit, and a valve for throwing the casing into communication with the supply conduit through said branch conduit.

In testimony whereof, we hereunto affix our signatures.

LEE S. CHADWICK.
MARC RESEK.
JOHN ALGER DAHLSTROM.